United States Patent [19]
Garcia

[11] Patent Number: 5,224,149
[45] Date of Patent: Jun. 29, 1993

[54] TESTING SYSTEM FOR DIGITAL TRANSMISSION LINES

[75] Inventor: Frank X. Garcia, Aurora, Ill.

[73] Assignee: Teltrend, Inc., St. Charles, Ill.

[21] Appl. No.: 841,729

[22] Filed: Feb. 26, 1992

[51] Int. Cl.[5] .............................................. H04B 3/46
[52] U.S. Cl. .......................................... 379/5; 379/22; 375/10
[58] Field of Search ............... 379/22, 5, 4; 375/3, 375/10

[56]  References Cited
U.S. PATENT DOCUMENTS 4,446,340  5/1984  Fryer ........................................ 379/5

Primary Examiner—Stafford Schreyer
Attorney, Agent, or Firm—Allegretti & Witcoff, Ltd.

[57]  ABSTRACT

A testing system for digital transmission lines with a metallic loopback and direct current bypass for use with regenerative repeaters. The Bell telephone network typically includes transmit and receive lines interconnected to a central office. Regenerative repeaters positioned along the lines detect signals and regenerate new signals. The present invention includes a controller, loopback line, and bypass. The loopback line interconnects the transmit and receive lines upon receiving a test activation signal from the controller. The bypass allows direct current to pass through to the rest of the line during a test. Accordingly, when a test of the telephone lines is to be performed, lines will allow the test signal to loop back to the source of origin, but will block the loopback of DC power signals. Moreover, DC power is supplied to the rest of the transmission line, in the same manner as when the testing procedure is not occurring. Moreover, the loopback line is positioned such that the overload protection circuitry is also subject to the performance test.

11 Claims, 4 Drawing Sheets

TESTING SYSTEM FOR DIGITAL TRANSMISSION LINES

BACKGROUND OF THE INVENTION

The present invention relates generally to testing systems for digital transmission lines and, more particularly, to a testing system for digital telecommunications transmission lines that allows for a metallic loopback of test data and a direct current ("DC") bypass. Many digital telecommunications transmission facilities include a central office which may transmit data, or "payload," signals over transmission lines to customer premises equipment. Typically, the payload is sent over the transmission lines differentially on two copper conductors, known as the Tip-Ring pair.

The Bell telephone system in the United States, for example, has widely utilized Digital "D" multiplexing pulse code modulation systems. A "D" channel bank, for example, commonly provides multiple DS-1 signals that are carried on a T-1 Transmission system. Each T-1 carries 24 Full Duplex channels on two pairs of exchange grade cables. One pair of cables is provided for each direction of transmission.

For clarification and simplification of terminology, the pair of cables carrying signals from the central office to the customer premises equipment is designated as a "transmit" line, and the pair of cables transmitting data from the customer premises equipment to the central office is designated as a "receive" line. This designation is made for convenience only; of course, when an observer (or testing technician) changes position from a central office to the customer premises, what used to be a "transmit" line becomes a "receive" line, and the "receive" line becomes a "transmit" line.

Payload signals are received by the telephone company and are transmitted, via the transmission lines, to a series of regenerative repeaters. Such repeaters are spaced along the transmission lines approximately every 6,000 feet. Each length of approximately 6,000 feet of cable may be designated as a "span."

The first repeater receives the data from the central office repeater, but, because of transmission line losses, jitter, noise, interference, and distortion, the signal will have degraded. The repeater recognizes the presence or absence of a pulse at a particular point in time and, if appropriate, regenerates a relatively clean, new pulse.

The regenerative repeater, or line repeater, is powered through the transmission cable itself to generate new pulses. Longitudinal, or common mode, direct current is applied supplied to the simplex lead to power the T-1 line repeaters. New pulses are transmitted by the repeater along more cable to either another line repeater or to the customer premises equipment.

As a part of its maintenance program, the telephone company may interconnect a test set (such as, for example, a Hewlett Packard 3787B test set) between the transmit and receive channels. The telephone company may then test the integrity of the lines and isolate (or "sectionalize") malfunctions along the transmission lines.

Such diagnostics may involve simply the ascertaining whether or not a particular span of cable provides continuity along its entire length. For example, an activating signal may be sent by the test set in, for example, the central office. The signal may designate a first repeater to "loopback" the signal from the transmit line to the receive line. Accordingly, a signal sent down the transmit line should then be received immediately thereafter at the receive line in the central office, if the lines to and from the repeater are continuous and the repeater has performed a loopback between the transmit and receive lines. In such a case, if continuity is proven, the test set may then instruct the repeater to connect the lines in standard transmission mode but, however, instruct the next most proximate repeater to loopback signals. Thereafter, if the test signal applied to the transmit line is not then also received at the receive line, the telephone company technician will know that the malfunction has occurred between the loopback of the first repeater and the loopback of the second repeater. The error in the line has then been sectionalized to a 6,000 foot interval rather than the entire length of the transmission line.

New generation DS1 fault location systems may perform even more complex diagnostics which, in addition to checking for discontinuities, can also look for transmission abnormalities such as bi-polar violations, "stress" pattern errors and, for example, provide information on the number of seconds of severely errored data that is transmitted along the lines. The types of performance evaluation messages possible are defined, for example, in the American National Standards Institute Specification T-1.403-1989. The telephone company wishes to be able to quickly and inexpensively isolate the location of, or sectionalize, the malfunction.

The craftsman also wishes to obtain true sectionalization of the transmission lines, and thus more precisely locate the difficulty. Importantly, the test equipment should not affect line performance, such that a line might perform differently with and without the test equipment applied to the line. For example, the stress patterns (occurrences of severely distorted information) may vary if the line is significantly altered in order to perform a sectionalization test.

Moreover, it is important that all portions of the transmission lines be subjected to a test when the telephone company performs a diagnostic test on a line's performance. There is typically a metal interface forming part of the physical connection between the repeater and the beginning (or end) of another span. The data looped back from the transmit to the receive line should be close to such metal, thus providing a "metallic" loopback. Such a metallic loopback thus, for example, may allow for the testing not only of the regenerative features of the repeater itself, but also of other circuitry, such as overload protection equipment that may be within the repeater. The overload protection circuitry can be damaged by lightening surges during lightening storms and extremely high voltages from shorted power lines.

Also, it is important that the components of the test system used in the field have relatively small physical size and weight. Moreover, a test system should be inexpensive to manufacture and install. Furthermore, the testing system should be reliable, so as to increase the reliability of the telephone system itself.

Unfortunately, many of the presently available performance monitoring systems are not ideally suited to the demands of the telephone companies. Many of the presently available systems do not allow a "metallic" loopback during testing. Such systems may allow for the testing of the regenerative aspects of the line repeater, but not of its overload protection circuitry.

Also, many available systems may, during testing, remove the DC power applied to spans and repeaters located farther away from the test set than the repeater which has been instructed to loopback signals. Such blocking of DC signals from the outlying spans and repeaters may affect the test results received during interrogation. Furthermore, prior art systems may require the installation of bulky, heavy, and expensive equipment in the field.

SUMMARY OF THE INVENTION

In a principal aspect, the present invention relates to a testing system for digital transmission lines. The transmission lines includes first and second transmit spans and first and second receive spans. Each of the spans is interconnected to a repeater. The repeater includes a regenerator that both receives signals from the first transmit span and, in response, regenerates a signal on the second transmit span. In addition, the regenerator typically receives a signal on the first receive span and, in response, generates a signal on the second receive span.

The testing system for such a digital transmission line includes a controller, loopback line, and bypass. The controller provides a test activation signal when a test is to be performed. The loopback line receives the activation signal and responsively interconnects the second transmit and first receive spans. The loopback line also blocks direct current so that only the signal itself is looped from the transmit span to the receive span. The bypass also receives the activation signal and, in response, blocks AC signals from the second transmit span, but does allow direct current to pass through to the second transmit span.

Thus, an object of the present invention is an improved testing system for digital transmission lines. Yet another object is an improved test system which provides for both metallic loopback and DC bypass.

Yet another object is a testing system for digital transmission lines that is smaller and more light weight and less expensive to manufacture. Still a further object of the present invention is a testing system that is simpler and more reliable.

Still another object test system that more easily allows for true sectionalization of a transmission line and that more easily allows for testing of overload circuitry. Yet still another object is the testing system that may allow for improved testing with metallic loopback and DC bypass from either the central office or customer premises equipment. These and other objects, features, and advantages of the present invention are discussed or are apparent in the following detailed description.

BRIEF DESCRIPTION OF THE DRAWINGS

Preferred embodiments of the present invention are described herein with reference to the drawings wherein.

DETAILED DESCRIPTION OF THE PREFERRED EMBODIMENT

Figure 1:
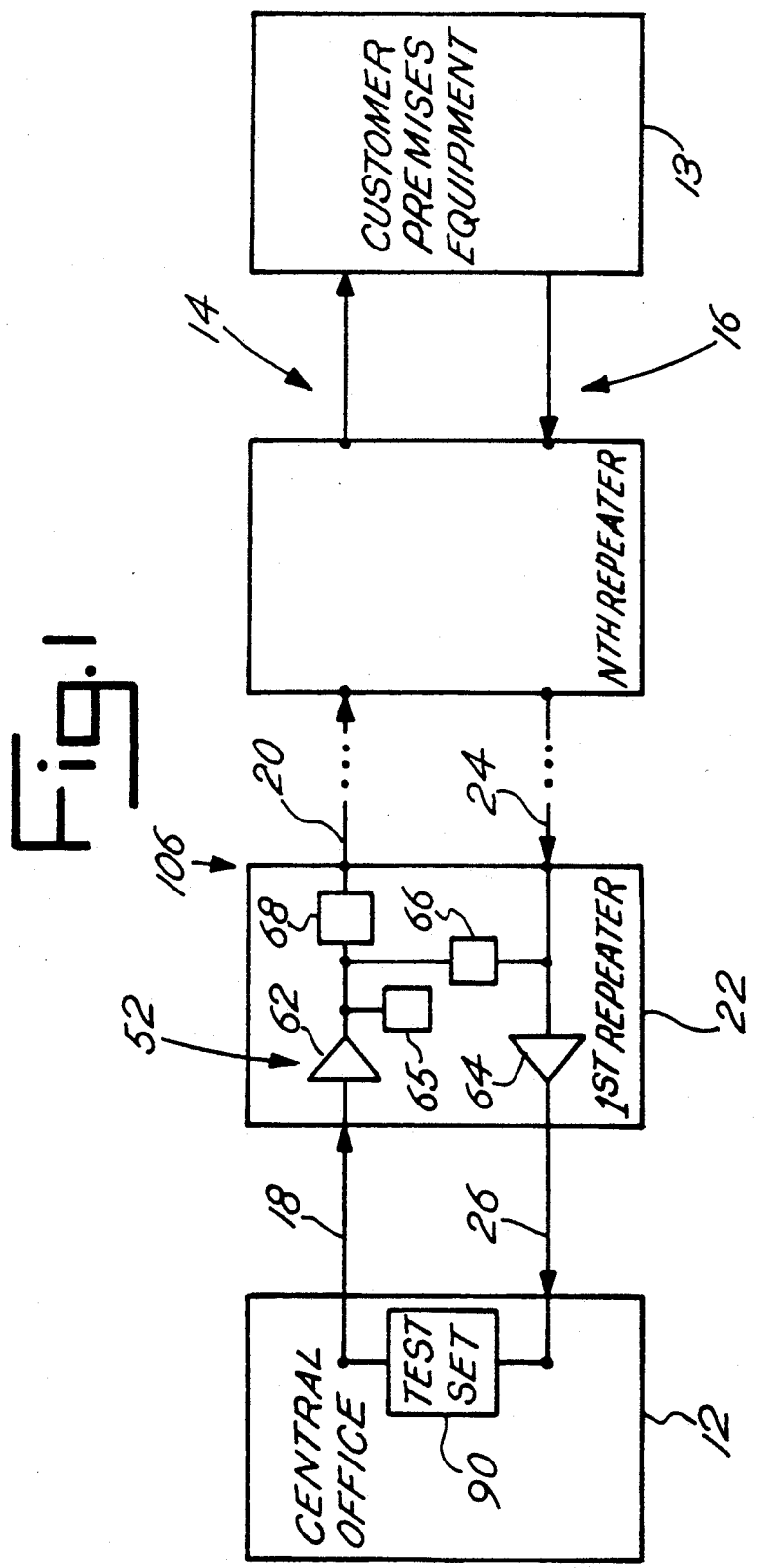
FIG. 1 is a block diagram of a preferred embodiment of the present invention.
Figure 2:
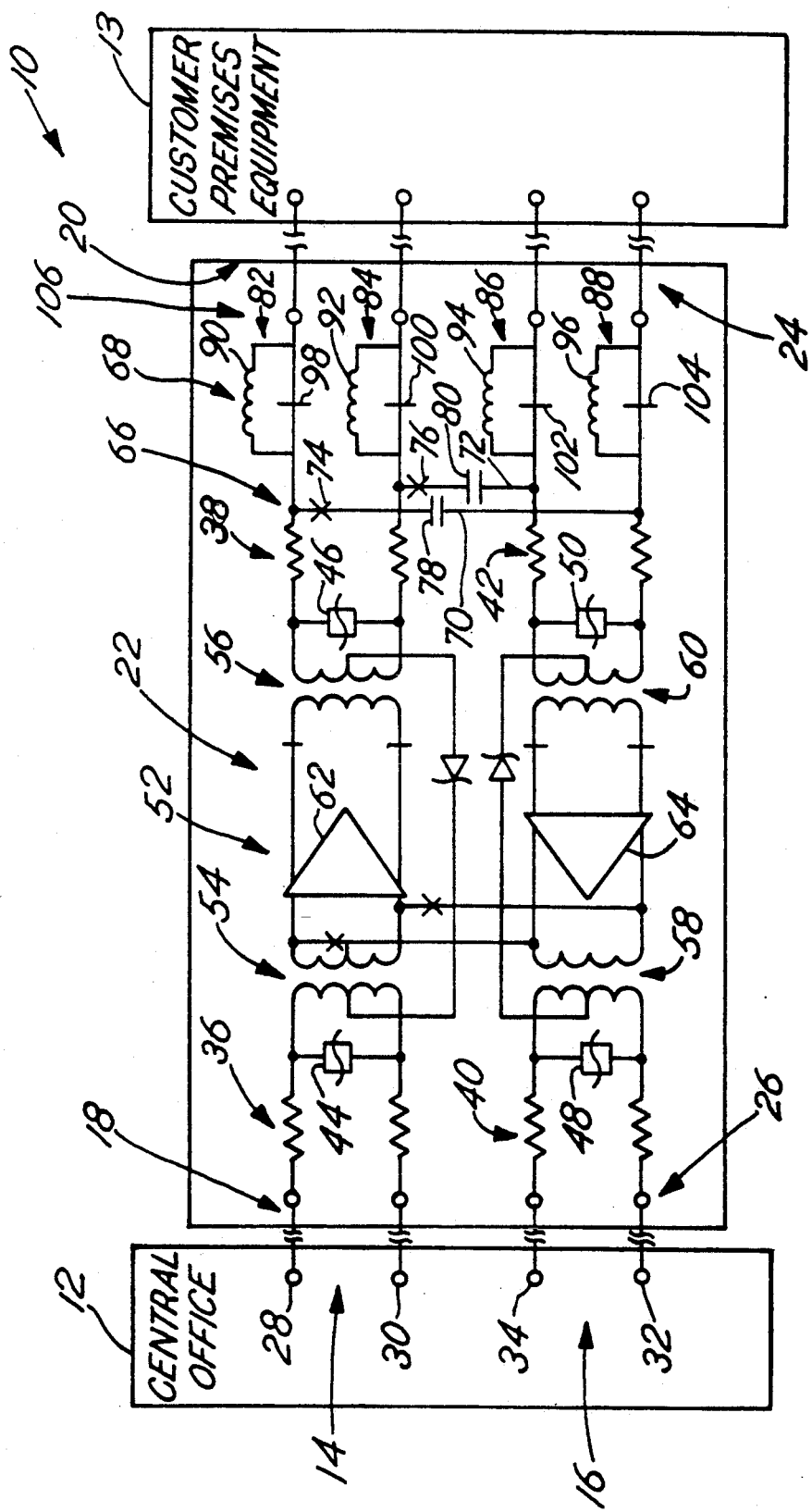
FIG. 2 is a schematic diagram of the preferred embodiment shown in FIG. 1.

Referring to FIGS. 1-4, a preferred embodiment of the present invention is shown as a testing system for digital transmission lines with metallic loopback and DC bypass 10. As shown in FIGS. 1 and 2, the telecommunication transmission facilities for the test system 10 include a central office 12, customer premises equipment 13, a transmit line 14, and a receive line 16.

The designations of "transmit" and "receive" lines are, of course, purely arbitrary and labeled as shown in FIGS. 1-4 only for convenience. A "transmit" line becomes a "receive" line if the observer merely changes his or her position.

The transmit and receive spans are each broken into segments, designated as a spans. As shown in FIGS. 1 and 2, the receive line 16 includes first and second spans 18, 20 positioned on either side of a first repeater 22. Similarly, the receive line 16 includes first and second spans 24, 26 on either side of the repeater 22. The transmit line 14 is made up of first and second cables 28, 30; the receive line 16 is similarly made up of first and second cables 32, 34.

Many repeaters also include protection circuitry within them to limit the damage to the repeater and the transmission lines should the line be stuck by lightening or should power cross occur (wherein power cables are short-circuited against each other). Such overload protection circuitry may include, as shown in FIG. 2, high wattage, current-limiting resistors 36, 38, 40, 42 to limit the amount of current that will pass through a particular line when a high voltage applied to it. Also, varistors 44, 46, 48, 50 are placed across the cables 28-34 which make up the transmit and receive lines 14, 16 to again limit the current in the lines 14, 16 when a high voltage is accidentally applied.

The repeater 22 also includes regeneration circuitry 52, first and second transmit transformers 54, 56, and first and second receive transformers 58, 60. The regeneration circuitry 52 includes first and second regenerators 62, 64. The first regenerator 62 receives signals from the first transformer 54 and then responsively provides a regenerated signal to the second transformer 56. A regenerated signal is then supplied to the second span 20 of the transmit line 14. Similarly, the second regenerator 64 senses a signal applied to the first span 24 of the receive line 16 and causes a regenerated signal to be applied to the second span 26 of the receive line 16.

Figure 4:
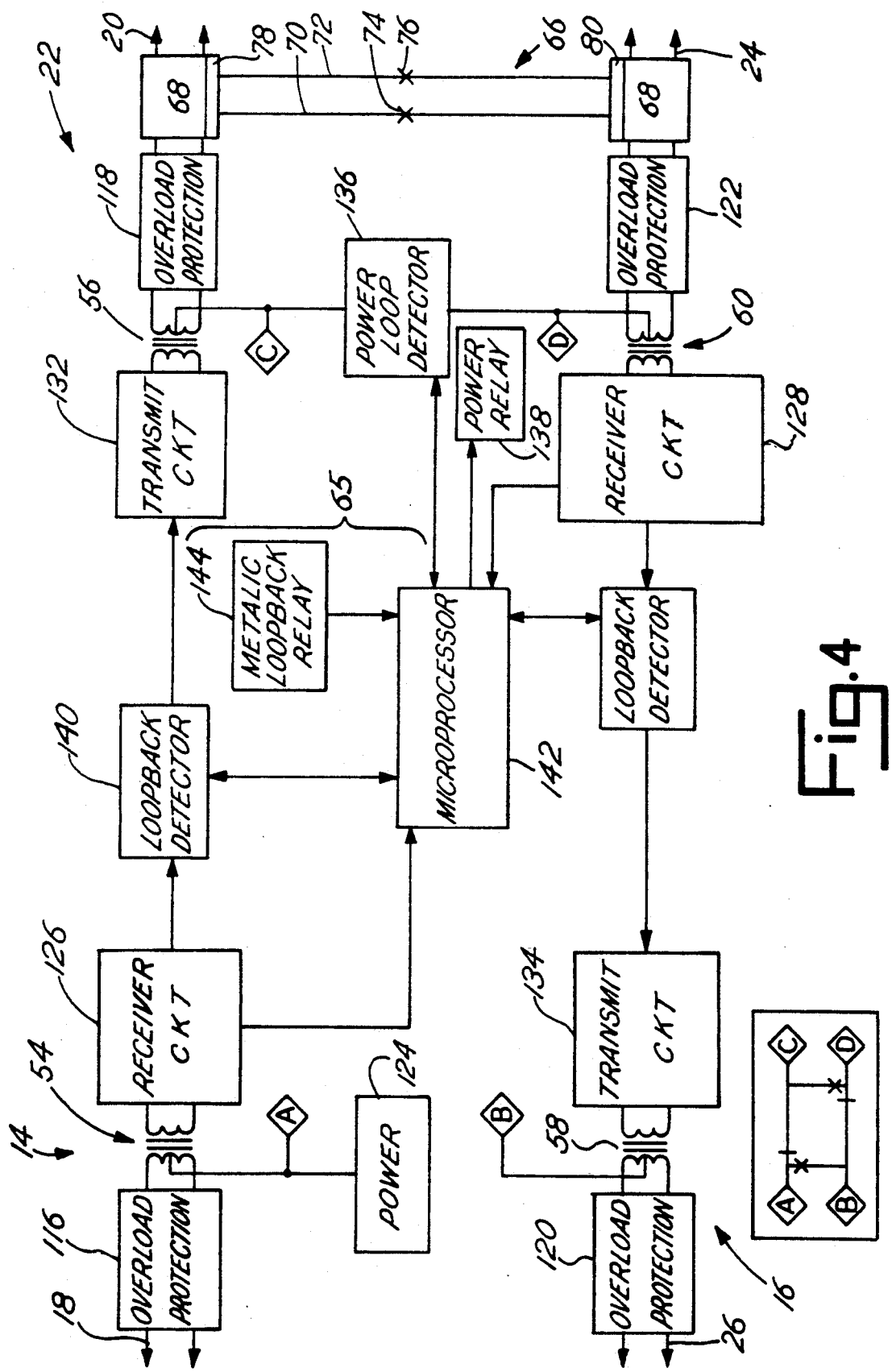
FIG. 4 is a more detailed block diagram of the preferred embodiment shown in FIG. 1.

In the preferred embodiment shown in FIGS. 1, 2, and 4, the repeater 22 further includes a controller 65 (see FIGS. 1 and 4), loopback line 66, and bypass 68. The loopback line 66 includes first and second cross lines 70, 72. The first cross line 70 interconnects the first cable 28 of the second span 20 of the transmit line 14 with the first cable 32 of the first span 24 of the receive line 16. Conversely, the second cross line 72 interconnects the second cable 30 of the second span 20 of the transmit line 14 with the second cable 34 of the first span 24 of the receive line 16. Each cross line 70, 72 includes a normally open switch 74, 76 and a DC blocking capacitor 78, 80. Thus, during normal transmission, the cross lines 70, 72 have virtually no affect on the performance of the repeater 22.

The bypass 68 includes four controls 82, 84, 86, 88, each of which is each interconnected to one of the cables 28-34 of the span lines 20, 24. The controls 82-88 each include an inductor 90, 92, 94, 96, in parallel with a normally closed switch 98, 100, 102, 104. The control 82 interconnects the first cable 28 of the second span 20 of the transmit cable 14 with the rest of the repeater 22. The remaining controls 84–88 similarly interconnect a cable with the rest of the repeater 22. The remainder of the elements of the repeater 22, including the overload protection circuitry and the regeneration circuitry, are positioned between the cross lines 70, 72 and test a set 90 in the central office 12. Accordingly, when test loopback occurs, all elements in the repeater 22 may be interrogated.

Since the switches 98–104 are normally closed, and the switches 74, 76 are normally open, during normal, transmission, operation of the repeater 22, the loopback 66 and bypass 68 have virtually no effect on the performance of the repeater 22. When a test activation signal is transmitted, however, the normally closed switches 98–104 open, and the normally open switches 76, 74 close.

During a test, direct current is virtually unaffected by the open switches 98–104. For example, direct current continues to flow around the now open switches 98–100, through the inductors 90–96, and into the second span 20 of the transmit line 14. Similarly, direct current continues to flow from the first span 24 of the receive line 16, through the inductors 94, 96, into the rest of the repeater 22. However, the inductors 90, 96 substantially block any test signal or alternating current from flowing out of the repeater 22 into the second span 20 of the transmit line 14. Rather, the test signal is diverted through the switches 74, 76, and through the capacitors 78, 80 (which provide essentially no resistance to test data or other AC signals). The test signal flows back, through the repeater 22, through the second span 26 of the receive line 16, to the central office 12.

The inductors 90, 92 allow current to power the second span 20 of the transmit line 14. Similarly, the inductors 94, 96 allow the DC power level of the receive line 16 to be unaffected by the change of the repeater 22 to a test mode. Moreover, the loopback occurs substantially adjacent the metallic interface 106 between the repeater 22 and the spans 20, 24.

Figure 3:
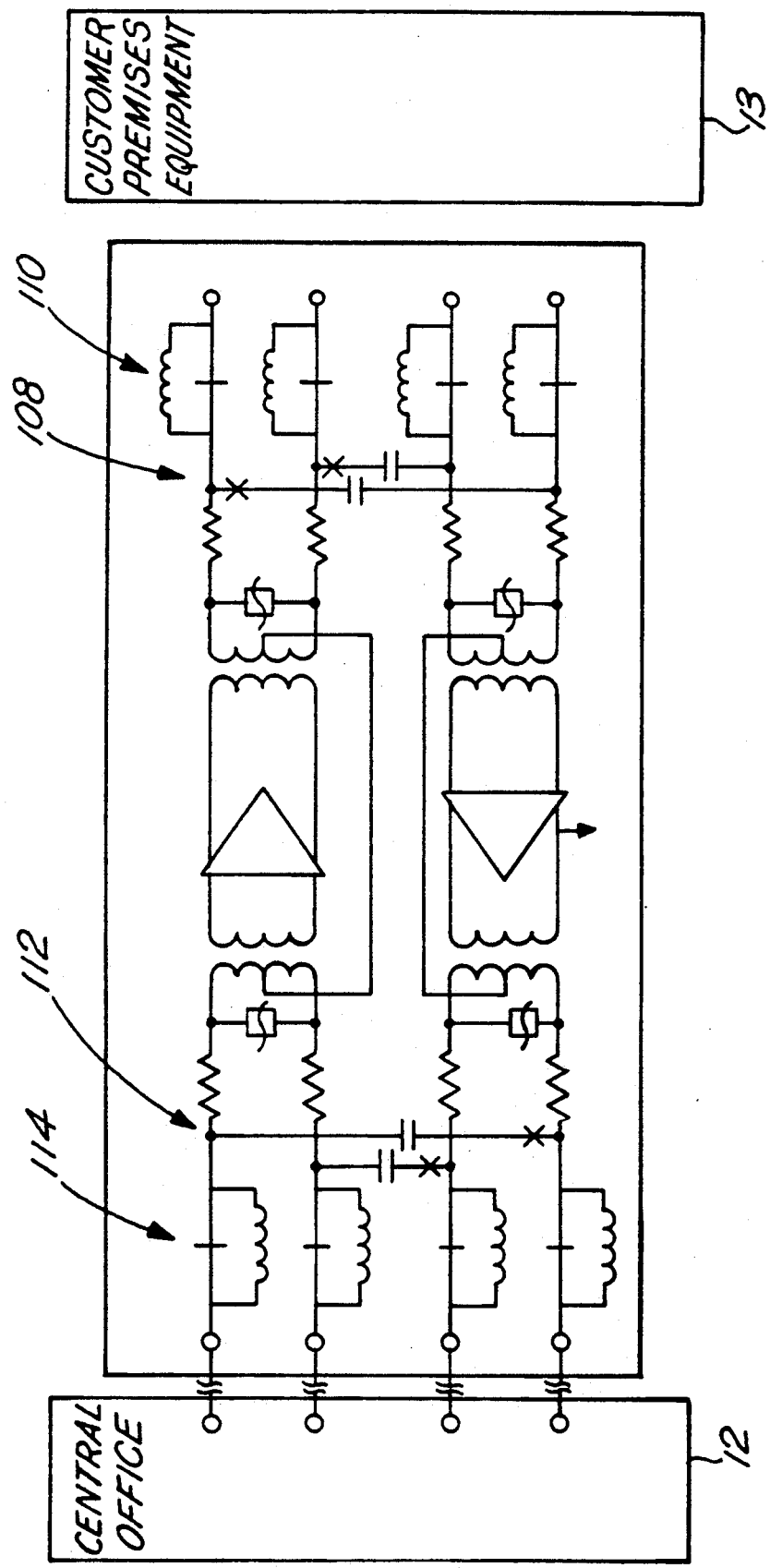
FIG. 3 is a schematic diagram of an alternative embodiment of the invention shown in FIG. 1, which allows metallic loopback toward both the central office and the customer premises equipment.

Yet another embodiment of the present invention is shown in FIG. 3, where a metallic loopback may occur toward either the central office, as shown in FIG. 2, or toward customer premises equipment. As shown in FIG. 3, the test equipment includes, as before, a loopback line 108 and bypass 110. Such elements operate in the same manner as described previously with respect to the system 10 disclosed in FIG. 1.

The invention shown in FIG. 2, however, further includes a second loopback line 112 and a second bypass 114. Accordingly, the second loopback line 112 and second bypass 114 remain unaffected when a test is performed from the central office 12. The second loopback line 112 and bypass 114 remain in transmission mode, having virtually no effect on the circuit. However, when metallic loopback is desired from the customer premises equipment 13, the second loopback 112 and second bypass 114 now become active, and the first loopback 108 and bypass 110 resume a normal transmission mode.

A more detailed block diagram of the invention shown in FIGS. 1 and 2 is shown in FIG. 4. The repeater 22 is shown as a microprocessor-based system having the controller 65, overload protection 116, 118, 120, 122, a power supply 124, receiver circuitry 126, 128, transmit circuitry 132, 134, a power loop detector 136, and a power relay 138. The controller 65 includes a loopback detector 140, microprocessor 142 and metallic loopback relay 144.

The data to be transmitted over the lines, such as speech, as sampled at a rate of such as 8,000 hertz, and the amplitude of each signal is measured. The amplitude of each sample is compared to a scale of discrete values and assigned an numeric value. Each discrete value is then coded into a binary form. Representative binary pulses appear on the transmission lines.

Each of the twenty-four channels on, for example, a T-1 system, is sampled within a 125 microsecond period. The period is called a frame. To each frame, an additional synchronizing bit is added in order to signal the end of the frame.

Since there are eight bits per channel, and there are twenty-four channels and there is one pulse at the end of each frame, the total number of "bits" needed per frame is 193. The synchronizing bit may be adjusted to signal to the detector 140 in the repeater 22 that, for example, a loopback test is required. In such a case, the repeater 22 will discontinue its normal operation and interconnect the transmit and receive lines. Thereafter, a test set may apply signals to the transmit line, detect the signals at the receive line, and determine the extent to which transmission errors have occurred.

In operation, the detector 140 senses a network control code and determines that a operator wishes, for example, the repeater 22 to enter into a metallic loopback mode. The loopback detector 130 signals the microprocessor 142 accordingly. The microprocessor 142, in turn, causes the metallic loopback relay 144 to change, thereby changing the states of the switches 74, 76, 98, 100, 102, and 104.

In normal transmission mode, however, the payload applied by the first span 18 of the transmit line 14 to the first transformer 54 is sensed by the receiver circuitry 126. The receiver circuitry 126 forwards the signal to loopback detector 140, which senses whether a particular loopback code is set forth in the synchronizing bits. If not, the transmission circuitry 132 then regenerates the signal and applies it to the transformer 56, and the regenerated signal is then applied the second span 20 of the transmit line 14.

The power loop detector 136 may sense an open transmission path on spans between repeater 22 and customer premises equipment 13. If this happens, the detector 136 signals the microprocessor 142, which, in turn, causes the power relay 138 to effect such a complete power loopback.

Preferred embodiments of the present invention have been described herein. It is to be understood, of course, that changes and modifications may be made in the embodiments without departing from the true scope and spirit of the present invention as defined by the appended claims.

I claim:

1. A testing system for digital transmission lines, said transmission lines including first and second transmit spans and first and second receive spans, each of said spans being interconnected to a signal repeater, comprising, in combination:

a controller for providing a test activation signal;

a loopback line for receiving said activation signal and responsively interconnecting said second transmit and first receive spans, said loopback line including a block to direct current; and a bypass for receiving said activation signal and, in response, (1) substantially blocking AC signals from passing from said first transmit span to second transmit span and (2) bypassing direct current from said first transmit span to said second transmit span.

2. A testing system as claimed in claim 1 further comprising a second bypass for receiving said activation signal and, in response, (1) substantially blocking AC signals from passing from said first receive span to said second receive span and (2) bypassing direct current from said first receive span to said second receive span.

3. A testing system as claimed in claim 2 wherein said test signal is issued from a central office and wherein said system further comprises:
 a second loopback line for receiving a second activation signal issued from a customer premises and said second loopback line responsively interconnects said first transmit and second receive spans, said second loopback line including a block to direct current; and
 a second bypass for receiving said second activation signal and, in response, (1) substantially blocking AC signals from passing from said first receive span to second receive span and (2) bypassing direct current from said first receive span to said second transmit span.

4. A testing system as claimed in claim 2 wherein said loopback includes a normally open switch, interconnected to said controller, wherein said switch closes upon receiving said activation signal.

5. A testing system as claimed in claim 4 wherein said block to direct current comprises a capacitor.

6. A testing system as claimed in claim 4 wherein said bypass comprises an inductor in parallel with a normally closed switch, said normally closed switch opening in response to said activation signal.

7. A testing system as claimed in claim 6 wherein said controller includes a detector for detecting a test signal issued by a test set along one of said transmission lines and responsively issuing said activation signal.

8. A testing system as claimed in claim 7 wherein said repeater further includes overload protection circuitry and said overload protection circuitry is positioned between said test set and said loopback line.

9. A testing system as claimed in claim 8 wherein said overload circuitry comprises a current limiting resistor.

10. A testing system as claimed in claim 9 wherein at least one of said spans comprises a pair of cables and said overload protection circuitry further comprises a varistor between said pair of cables.

11. A testing system as claimed in claim 10 wherein said controller comprises a microprocessor.

* * * * *